Jan. 27, 1970 J. L. KELLY ET AL 3,492,004

GUIDING STRUCTURE FOR PHONOGRAPH TONE ARMS

Filed Jan. 3, 1968

INVENTORS:
JACK L. KELLY,
RONALD K. WIANDT,
BY Thomas A. Brody
THEIR ATTORNEY.

United States Patent Office 3,492,004
Patented Jan. 27, 1970

3,492,004

GUIDING STRUCTURE FOR PHONOGRAPH TONE ARMS

Jack L. Kelly and Ronald K. Wiandt, Decatur, Ill., assignors to General Electric Company, a corporation of New York Filed Jan. 3, 1968, Ser. No. 695,491
Int. Cl. G11b *1/00*
U.S. Cl. 274—2 3 Claims

ABSTRACT OF THE DISCLOSURE

For conveniently positioning a recording tone arm and a playback tone arm in the desired starting positions on a record, a simplified camming structure is provided which involves coaction of the arms with integral inclined surfaces of the phonograph housing.

This invention relates to improved structure for readily locating a transducing arm of a phonograph on a record, and more particularly to a simplified structure for effectively positioning recording and reproducing arms of a recorder-reproducer in cooperative starting engagement with a disc type record.

There are numerous occasions when persons in various occupations, such as housewives and businessmen, find need for quickly and conveniently recording messages or letters. For such a purpose, it is important that the recording device be sturdy, portable and very compact in size. It is also desirable that such a device should be extremely simplified in structure and operation, thereby enabling virtually anyone to readily and efficiently utilize the equipment.

Accordingly, it is an important object of the present invention to provide an improved, compact, and portable recorder-reproducer apparatus which incorporates a novel arrangement for positioning a transducer arm in starting engagement with a disc type record.

An additional object of this invention is to provide a simplified and inexpensive structural means for expeditiously locating a transducing arm into operative engagement with a disc type record.

It is a further object of the present invention to provide an improved positioning means for a phonograph transducing arm, which requires a minimum number of parts.

In carrying out the present invention, in one form thereof, there is provided a recording and reproducing device which includes a support, and a turntable arranged thereon for carrying a disc type record member. A stylus carrying recording arm and a stylus carrying playback arm are provided for respectively recording and reproducing sound with respect to a disc type record. With such an arrangement, the recording and reproducing arms are normally retained in rest positions when they are not in operation. A cam surface is disposed on the support in the path of movement of each arm, for coaction with an associated arm during movement thereof from its rest position to an operative position. This cam surface acts upon the arm during lateral movement thereof to cam the arm downwardly into precise initial engagement with a record.

Figure 1:
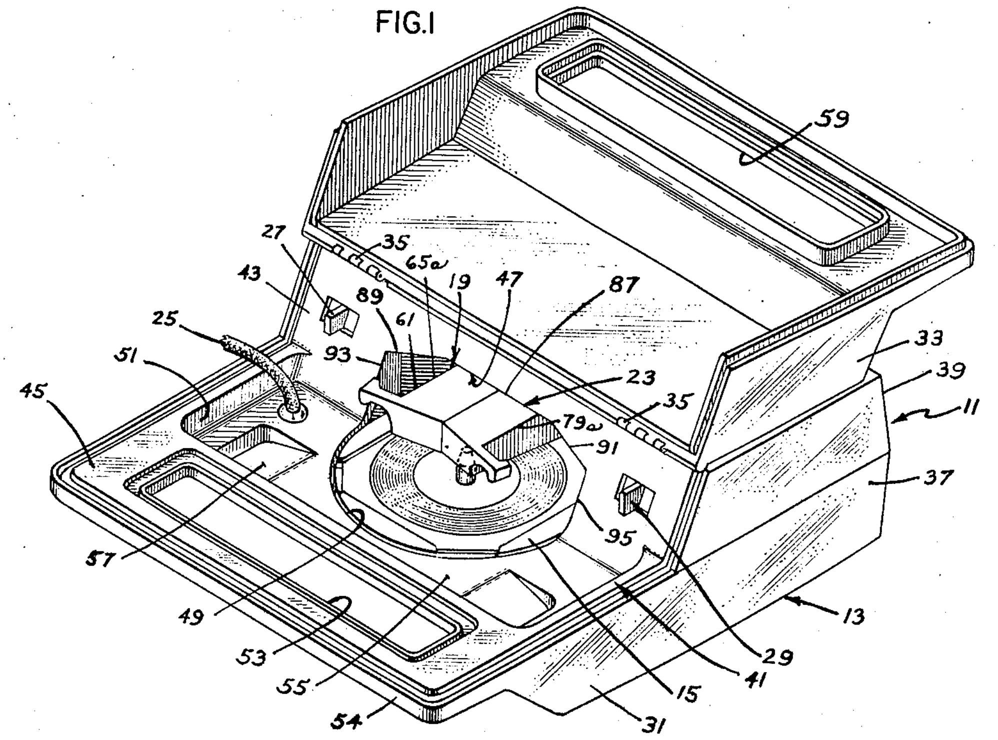
Figure 2:
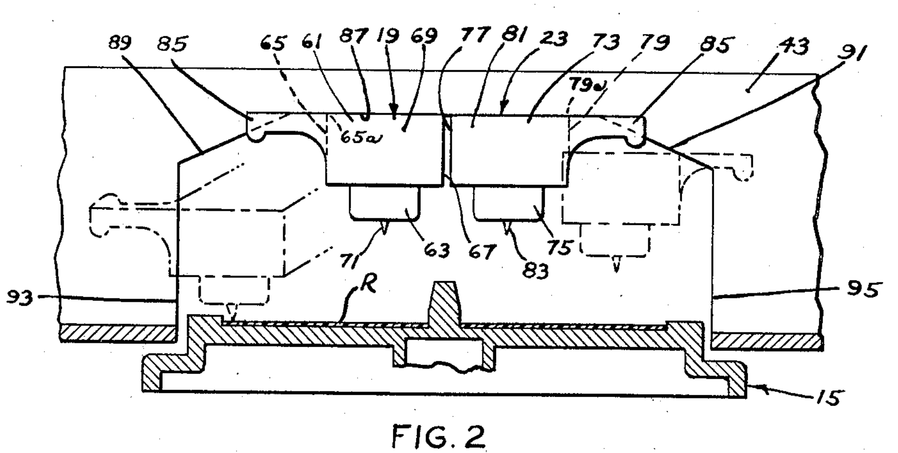

By further aspects of the present invention, additional desirable features may be included in the structure illustrated, and the specification concludes with claims particularly pointing out and distinctly claiming the subject matter which we regard as our invention. The invention, however, as to organization and method of operation, together with further objects and advantages thereof, may best be understood by reference to the following description, when taken in conjunction with the accompanying drawing, in which:

FIG. 1 is a perspective view of a disc type recording and reproducing device embodying the present invention, in one form thereof; and FIG. 2 is a fragmentary frontal view of the device illustrated in FIG. 1, showing the mode of operation of the recording and reproducing arms with respect to the device housing and with respect to a record positioned on the turntable.

Referring in detail to the drawing, and in particular to FIG. 1 thereof, there is shown a disc-type recording and reproducing device 11 embodying one form of our invention. The recording device 11 essentially comprises a housing 13 wherein the turntable 15 and its driving motor (not shown) are located, recording arm 19, playback arm 23, and an amplifier (not shown). It will be understood by those skilled in the art, that the recording device 11 also includes a speaker and a microphone which may be combined into a combination speaker-microphone type of headset connected to cord 25; however for purposes of simplicity, these structures have not been shown in the drawing illustration. For controlling the device 11, there is also provided an "on-off" and volume control knob 27 and a "pause" control knob 29. Knob 29 is thus for selectively coupling and uncoupling the driving motor to the turntable 15 for facilitating desired momentary interruption of its movement.

Turning now to a further discussion of the structure of housing 13 of device 11, it will be noted that, as shown in FIG. 1, the housing 13 has a generally L-shaped bottom portion 31 and a pivoted lid portion 33 which is connected to the bottom portion 31 by a pair of hinges 35.

The bottom portion 31 of housing 13 includes a pair of opposed generally L-shaped side walls 37 which extend vertically and are connected at their rear to a generally vertical rear wall 39. At the front of bottom housing portion 31 there is formed a shallow L-shaped deck 41. Deck 41 includes an inclined section 43 which is disposed at a small angle from normal relationship with respect to horizontal section 45. Thus, as shown in FIG. 1, the sloped section 43 of deck 41 extends upwardly and rearwardly from the back of horizontal section 45.

The deck 41 of bottom portion 31 of the device housing includes a slot 47 formed in sloped section 43 thereof to provide clearance for movement of the arms 19, 23 and access to the turntable 15. A portion of turntable 15 extends outwardly from slot 47 to allow ready access to the turntable for the placement and removal of records with respect thereto.

In deck 41 of the bottom housing portion 31 there is also formed a semicircular cutout section 49, a recessed tray-like area 51 within which the cutout section 49 is located, and an elongated rectangular handle slot 53. The semicircular cutout section 49 is provided to fit around and accommodate approximately one-half of the turntable 15, which is arranged therein in slightly raised relationship from being flush with the bottom surface 55 of the tray-like area 51. The tray-like area 51 includes a pair of spaced apart inclined recesses 57 for receiving a handset (not shown) when the device 11 is being stored. Elongated handle slot 53 is disposed in a lip-like upper extension 54 of bottom portion 31, and it cooperates with a similarly configured mating handle slot 59 of the lid portion 33 to assume an aligned engagement therewith when lid portion 33 is closed into engagement with bottom housing portion 31 (not shown). Slots 53 and 59, thus enable the device 11 to be readily carried by the hand of an operator when the housing members 31, 33 are in closed position.

For an understanding of the structure and mode of operation of our new and improved transducer arm camming structure, first a description of the recording and reproducing arms 19 and 23 is deemed necessary. Recording arm 19 is of one piece molded plastic construction, and it includes a box shaped recessed end portion 61 within which a recording head 63 is positioned. The end portion 61 of arm 19 includes longitudinal left wall 65 and a right wall 67 (viewing FIG. 2) which are connected to a front wall 69. The head 63 carries a depending recording stylus 71.

Play back arm 23 is structured similarly to recording arm 19. Thus, arm 23 is also of one piece molded plastic construction and it includes a box shaped recessed end portion 73 within which a reproducing head 75 is positioned. The end portion 73 of arm 23 includes longitudinal left wall 77 and right wall 79 (viewing FIG. 2) which are connected to front wall 81. The head 75 carries a depending playback stylus 83. Playback arm 23 and recording arm 19 differ in construction notably in that each arm includes a manually graspable finger 85 (FIG. 2) that faces angularly away from the other arm. Thus, as best shown in FIGURE 1, finger 85 of arm 19 extends laterally sideways, forwardly, and away from arm 23. The fingers 85 of the respective recording and playback arms 19 and 23 enable the user of the recording device 11 to readily manipulate either of the arms 19, 23 into its desired "rest" or "operational" positions, as shall become further apparent hereinafter.

It will also be seen in FIG. 1 that the aforementioned slot 47 in sloped section 43 of housing deck 41, includes a centrally disposed horizontal edge 87. At each of its ends, the central edge 87 of slot 47 is connected respectively to right and left camming edges 89 and 91. The lower extremities of the camming edges 89 and 91 are in turn connected respectively to vertical side edges 93 and 95 of the slot 47.

As shown in FIG. 1, the recording arm 19 and playback arm 23 are located in their rest positions. These arms are normally maintained in such a position when the device is being stored or not in use by a suitable detent mechanism. One particularly adaptable detent mechanism for such a purpose is set forth in our copending application Ser. No. 611,711 filed on Jan. 25, 1967, now Patent No. 3,375,011.

In using the above described inventive structure, when it becomes desirable to operate the playback arm 23 to its sound reproducing position, all the operator has to do is grasp the handle 85 of arm 23, pull the arm 23 to the right in the general direction of horizontal edge 87, then engage the side 79 (FIG. 2) or upper right corner 79*a* (FIG. 1) of the arm 23 with the camming edge 91, and lastly slide the arm 23 downwardly into its starting position along vertical edge 95. Thus, by merely using the three edges 87, 91, and 95 of slot 47 to guide the lateral movement of arm 23 downwardly and to the right, the playback stylus 83 may be accurately positioned in the desired starting engagement with the grooves of a record R positioned on turntable 15.

When it becomes desirable to operate the recording arm 19 to its initial sound recording position, the operator needs only to grasp handle 85 of arm 19, pull the arm 19 to the left in the general direction of horizontal edge 87, then engage the side 65 (FIG. 2) or upper right corner 65*a* (FIG. 1) of the arm 19 with the camming edge 89, and lastly slide the arm 19 downwardly into its starting position along vertical edge 93. By simply using the three edges 87, 89 and 93 of slot 47 to guide the lateral movement of arm 19 downwardly and to the left, the recording stylus 71 may be accurately positioned in the desired starting engagement with the record R positioned on turntable 15.

It will now, therefore, be seen that our new and improved camming arrangement for operating a recording arm and reproducing arm into its initial operating position, is very simplified in structure, novel in operation, and low in cost.

While in accordance with the patent statutes, we have described what at present is considered to be the preferred embodiment of this invention, it will be obvious to those skilled in the art that various changes and modifications may be made therein without departing from this invention.

What we claim as new and desire to secure by Letters Patent of the United States.

1. In a recording and reproducing device, a housing having an opening formed in a front wall thereof, said opening including a horizontal edge which faces downwardly and first and second inclined camming edges connected respectively to opposite ends of said horizontal edge, said first and second camming edges facing and extending downwardly and away from the opposite ends of the horizontal edge to which they are connected, a turntable rotatably supported by said housing for carrying a record member, said turntable extending outwardly through the opening of said housing, a stylus carrying recording arm and a stylus carrying playback arm each of which is supported by said housing for pivotal movement about a horizontal axis and a vertical axis, said stylus carrying recording arm extending outwardly from the opening of said housing and being disposed underneath a first portion of said horizontal edge when said recording arm is in a rest position, said recording arm being engageable with and following said first cam surface during movement of said recording arm between its rest position and an initial recording position thereby to precisely and selectively locate said recording arm alternatively in said initial recording position and in said rest position, said playback arm extending outwardly from the opening of said housing and being disposed underneath a second portion of said horizontal edge when said playback arm is in a rest position, said playback arm being engageable with and following said second cam surface during movement of said recording arm between its rest position and an initial playback position thereby to precisely and selectively locate said playback arm alternatively in said initial playback position and in said rest position, whereby said horizontal edge and said first and second inclined camming edges coact with said recording and playback arms to accurately, selectively and conveniently locate said arms in their initial operative or rest positions without the requirement of any additional parts in said device.

2. The device described in claim 1 wherein the opening in the front wall of said housing further includes a pair of vertical edges one of which is connected to the end of each of said first and second inclined camming edges, said vertical edges being in parallel relationship and disposed at opposite sides of said opening.

3. The device described in claim 2 wherein the rest positions for the recording arm and playback arm are located above and adjacent to the center of the turntable, and the first and second cam surfaces are each obtuse angular surfaces which coact with their associated arm to cam it first angularly downwardly and then vertically toward the intial position.

References Cited

UNITED STATES PATENTS

| | | | |
|---|---|---|---|
| 962,315 | 6/1910 | Claud | 274—22 |
| 1,264,691 | 4/1918 | Shoemaker | 274—9 |
| 1,423,360 | 7/1922 | Preston | 274—9 |
| 2,459,038 | 1/1949 | McKnight | 274—17 |
| 2,506,665 | 5/1950 | Giovannucci | 274—9 X |
| 2,772,093 | 11/1956 | De Napoli et al. | 274—14 |
| 3,079,159 | 2/1963 | King et al. | 274—14 |
| 3,307,851 | 3/1967 | Tourtellot | 274—23 X |

FOREIGN PATENTS

| | | |
|---|---|---|
| 9,071 | 8/1956 | Germany. |

HARRY N. HAROIAN, Primary Examiner